United States Patent [19]

Barto

[11] 4,375,152

[45] Mar. 1, 1983

[54] RECIPROCATING THERMAL ACTUATOR WITH HYDRAULIC MULTIPLIER

[76] Inventor: John A. Barto, 3416 Croydon Rd., Baltimore, Md. 21207

[21] Appl. No.: 338,285

[22] Filed: Jan. 11, 1982

[51] Int. Cl.³ .............................................. F03C 5/00
[52] U.S. Cl. ........................................ 60/530; 60/528; 374/195
[58] Field of Search ................. 60/527, 528, 530, 531, 60/325; 73/368.3, 368.4; 236/98

[56] References Cited

U.S. PATENT DOCUMENTS

| | | | |
|---|---|---|---|
| 1,176,727 | 3/1916 | Clorius | 73/368.4 X |
| 2,316,611 | 4/1943 | Neuse | 73/368.4 |
| 4,222,239 | 9/1980 | Negishi | 60/325 X |

Primary Examiner—Allen M. Ostrager
Assistant Examiner—Stephen F. Husar
Attorney, Agent, or Firm—John F. McClellan, Sr.

[57] ABSTRACT

A reciprocating thermal actuator with hydraulic multiplier has a thermally expansible fluid (expansible by heating or in an alternative embodiment by cooling) and heat exchange means including powered means for causing the thermally expansible fluid to cycle from expanded to nonexpanded state, in the process linearly driving a small area portion of a first piston which, in turn, through a large area portion of the first piston and hydraulic fluid provision drives a second, smaller-area piston to produce a linear output motion; return may be under spring bias; a free-floating bore-fitting second piston structure and a piston sleeve head at the motion output which has a sleeve returning and guiding on a portion of the housing for stability are also disclosed.

24 Claims, 6 Drawing Figures

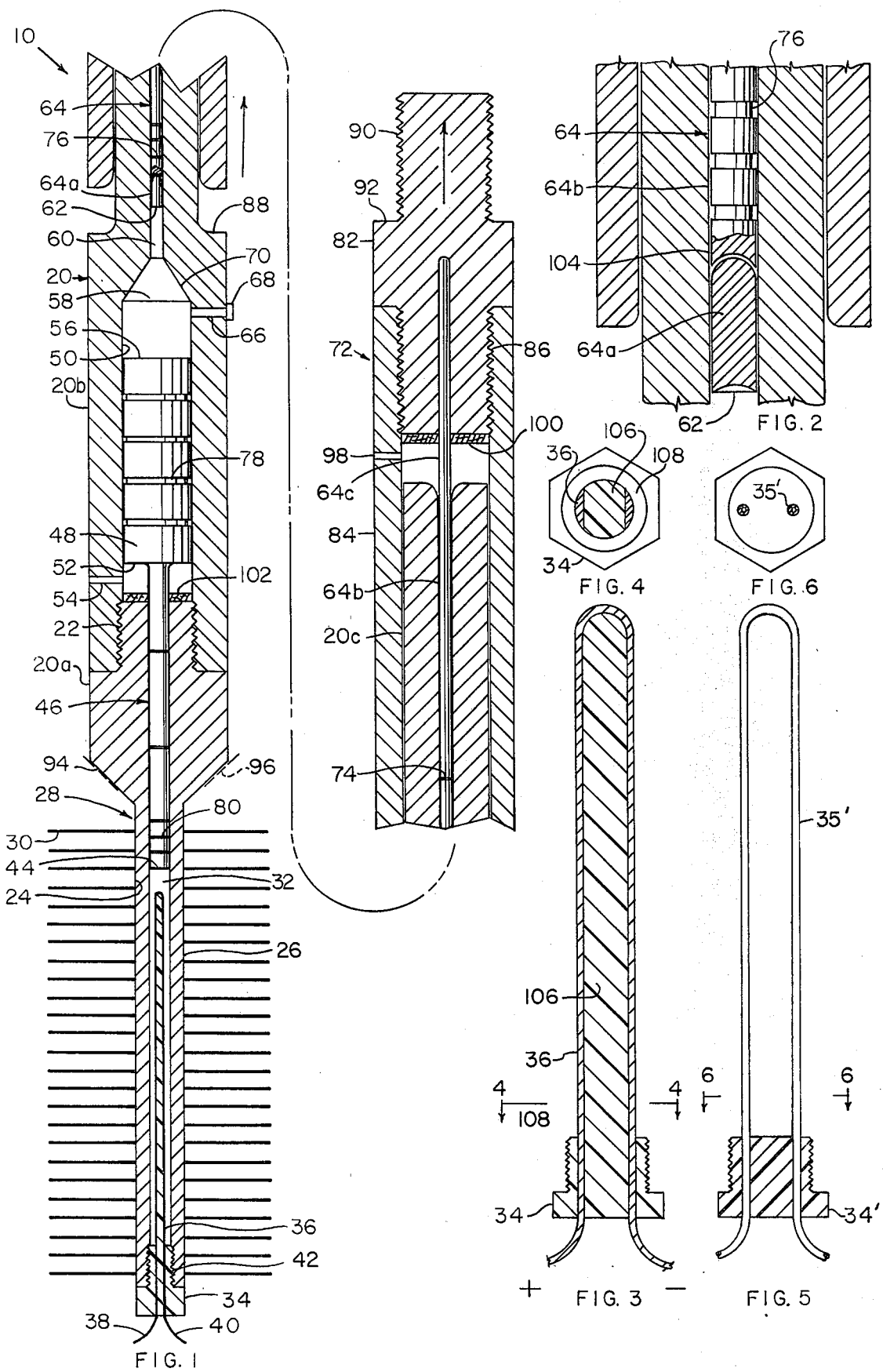

RECIPROCATING THERMAL ACTUATOR WITH HYDRAULIC MULTIPLIER

FIELD OF THE INVENTION

This invention relates generally to power-plants and specifically to reciprocating power-plants.

BACKGROUND OF THE INVENTION

Perhaps never before in the history of the world and certainly not in the history of the United States has a need for new sources of power appeared with such urgency.

According to some estimates world oil supplies will become exhausted within the next twenty to thirty years. Past political and economic crises over oil will predictably pale if this occurs without the substitution of other energy sources.

OBJECTS OF THE INVENTION

A principal object of this invention is to provide a new system for energy generation.

Further objects are to provide a system as described which is efficient, economical, reliable and which can use unchanged widely available and practically untapped natural phenomena for all or part of the energy generating cycle.

Still further objects are to provide a system as described which is practically non-polluting and noise-free, which is simple, safe and easy to build and to operate, and which is adaptable to embodiment in a wide range of sizes.

Yet further objects are to provide a system as described which requires only a few parts which are easily assembled by unskilled people and which can be operated under primitive conditions of use so that it is suitable for employment in vast areas of the world when powerplants are few or non-existent.

BRIEF SUMMARY OF THE INVENTION

In brief summary given as cursive description only and not as limitation, the invention includes a thermally actuated linear motion generator driving a motion-multiplying double hydraulic-piston assembly having a linear output.

BRIEF DESCRIPTION OF THE DRAWINGS

The above and other objects and advantages of this invention will become more readily apparent on examination of the following description.

FIG. 1 is a longitudinal partially sectional diagram of the invention as a whole in a first embodiment;

FIG. 2 is an enlarged detail taken from FIG. 1;

FIG. 3 is an enlarged detail taken from the left lower end showing in FIG. 1;

FIG. 4 is an enlarged sectional detail taken at 4—4, FIG. 3;

FIG. 5 is a view similar to that of FIG. 3 of an alternative embodiment portion; and FIG. 6 is an enlarged sectional detail taken at 6—6, FIG. 5.

DETAILED DESCRIPTION

FIG. 1 shows embodiment 10 of the invention. Housing 20 is an elongate preferably cylindrical member of two parts 20a, 20b preferably screwed together at 22 for ease in fabrication and assembly. The bore portions are coaxial.

A first bore portion 24 in relatively small diameter section 26 of the housing comprises a thermal hydraulic cylinder 28 with fins 30 for heat exchange externally on the relatively small-diameter section.

The thermal hydraulic cylinder has a supply of thermally expansible fluid 32 in it. Paraffin might be used to greater advantage than any substance other than $H_2O$. However, despite its fluid qualities, paraffin has characteristics of a solid at room temperature and could be when employed in this machine.

Bounding the thermally expansible fluid on one end is an end plug 34 with a powered heating means 36 such as a loop of heating wire sealed through it with ends 38, 40 passing to the outside. The end plug 34 is an insulator closely fitting the first bore portion 24 and held in it by integral threading 42 into the first bore portion.

Bounding the thermally expansible fluid on the opposite end from the heating means is a small head 44 of a first piston 46. The first piston has a large head 48 within a second portion 50 of the bore which forms with a larger diameter portion along 28b a larger diameter cylinder for the large head.

The second portion 50 of the bore in the region where the small head 44 integrally joins the first end 52 of the large head 48 has an air hole 54 to prevent pressure change in that region.

At the second end 56 of the large head the second portion 50 of the bore contains a quantity of hydraulic fluid 58, which extends into the third portion 60 of the bore to a first end 62 of a second piston 64.

For purposes of multiplying linear motion of the second piston 64 resulting from motion of the first piston 46, the second piston and third bore portion forming a cylinder for it preferably are many times smaller in diameter than the first piston large head 56 and second bore portion 50 forming a cylinder for it. As indicated, five-to-one is an example.

A bleeder hole 66 and cap 68 are preferably supplied through the wall of the second bore portion 50 near the third bore portion 60 which joins to the second bore portion at an integral conical section 70.

As a separate part 64a the second piston 64 preferably has a free-floating part on the end adjacent the first piston 46. In contact with this is the remainder or second part 64b of the second piston which extends as an elongate, preferably uniform diameter, rod completely through the third bore portion 60 and beyond it as part of a linear motion output 72. Annular groove structure may be provided for lubriaction in the second piston as at 74, 76, as well as in the first piston as at 78 and 80.

To assure that the free end 64c of rod 64b does not buckle under the large compressive loads to which it will be subjected, the extreme end portion of it is fixed, as by welding, in a piston sleeve head 82.

The piston sleeve head has a piston sleeve 84 which may be screwed to it as at 86, and which returns in freesliding grinding fit over a guide portion 20c of the housing forming the wall of the third bore portion. A step portion 88 of this wall or neck of the larger hydraulic cylinder provides a stop preventing the second piston 64, which is nearly coextensive with the piston sleeve 84, from leaving the third portion of the bore. The previously mentioned conical transition 70 of the bore likewise can prevent overtravel of the second piston portion at 48.

Power take-off may be by means of a threaded outer end portion 90 and thrust-shoulder 92 on the piston sleeve head. An exterior tapered portion 94 of the thermal hydraulic cylinder may be fitted in an appropriate socket 96 (broken lines) to harness compressive loading of the unit in operation. Air hole 98 prevents pressure variation within the piston sleeve. Packing 100,102 may be employed conventionally to help seal and help lubricate, and to help cushion action.

In operation, the distance between the tapered portion 94 and the power take off portion 72 is caused to expand, yielding a power stroke (arrow) by change of temperature of thermally expansible fluid 32 which displaces first piston 46 in turn displacing hydraulic fluid 58 which then displaces second piston 64 a distance multiplied by the ratio of the cross-sectional area of second bore portion 50 to that of third bore-portion 60.

As one example, the actuating change of temperature may be caused by expansion of fresh water used as the thermally expansible fluid 32, as it freezes through heat exchange as with ambient sea water below the freezing temperature of fresh water. Winter temperature in most of the higher latitude will provide cold air sufficient for operation, allowing for the heating of homes and such. It is most practical, however, to run a refrigerant (for example, ammonia or freeon) through the tubes of FIG. 5 to effect freezing. The ice is then melted by ambient temperature. Or, heat generated through tube-resistance to an electrical current passed through the tubes may be used to melt ice. The fins 30 speed the heat exchange. After the freezing-caused linear motion is complete as indicated by the stroke of the linear motion output or power take-off 72, suceeding cycles of strokes may be initiated by melting the ice using heating means 36 and allowing the freezing to re-occur in the same manner.

Return may be under bias of the load or under spring bias, or, if desired, the reduced volume upon melting may be permitted to pull the pistons back. Avoidance of a gaseous or significantly compressible state is the criterion in operation according to any mode.

As further example, the thermally expansible fluid 32 may be ethyl alcohol/ether or equivalent incompressible fluid which is heated by the heating means 36 to expand it and which is then chilled by suitable ambient exchange through the fins. Cold air and or cold water or glacial ice or other natural chilling sources may be employed.

FIG. 2 shows that the free-floating part 64a of the second piston 64 may have a concave spherical or cup-shaped first end 62 or end towards the second bore portion, and similarly a ball-and-socket connection 104 with the second part 64b of the second piston. Preferably the free-floating part 64a is of malleable material such as babbit so that it will tend to expand and fit the bore and ride smoothly in it. Grooves 76 may be used as lubrication grooves and as sealing grooves, as desired, conventional sealing being implied throughout as necessary but not shown.

FIGS. 3 and 4 show that the maximum of area for length can be exposed for heating element 36, it being passed from insulative sealing end plug 34 around an insulative axial protrusion 106 of the sealing plug and then back through the sealing plug. Face 108 or inner end of the sealing plug takes the axial thrust of the incompressible thermally expansible liquid on expansion of the liquid.

FIGS. 5 and 6 illustrate an alternative powered means. In place of the heating wire a tube of copper or other highly-thermally-conductive pressure resistant material may similarly pass in a loop 35' sealed through end plug 34' and out again. Through this may be run cold seawater or superior geodesic water or steam or alternately both for appropriately actuating the system, fluid of opposite temperature extreme being cyclically applied instead to the fins in conformance with the principles of the invention to produce reciprocating linear motion.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Lettes Patent is:

1. A system for generating a linear power stroke, comprising: a housing having: a thermally expansible fluid, means for exchanging heat cyclically with said thermally expansible fluid, a first piston having a large head and a small head, first means coupling the first piston for actuation by said thermally expansible fluid upon expansion of said fluid, a second piston, the second piston of smaller diameter than the first piston large head, second means coupling the first piston for hydraulically moving the second piston including hydraulic fluid in a space between the first piston and the second piston; and motion-output means associated with said second piston.

2. In a system as recited in claim 1, wherein said means for exchanging heat includes a thermal hydraulic cylinder with a first bore portion, said first bore portion containing said thermally expansible fluid therein.

3. In a system as recited in claim 2, said thermal hydraulic cylinder having a plurality of heat exchanger fins thereon.

4. In a system as recited in claim 2, said first bore portion smaller in diameter than said first piston large head, and said first bore portion substantially equal in diameter to said first piston small head.

5. In a system as recited in claim 4, and powered means in a portion of said first bore, said first means for coupling comprising said thermally expansible fluid being between the powered means and the first piston small head.

6. In a system as recited in claim 5, said powered means comprising heating means.

7. In a system as recited in claim 5, said powered means comprising cooling means.

8. In a system as recited in claim 5, said powered means comprising heating and cooling means.

9. In a system as recited in claim 5, and means for retaining said powered means in said first bore.

10. In a system as recited in claim 9, said means for retaining being a sealing screw plug with means for passing power therethrough.

11. In a system as recited in claim 5, said first piston small head being elongate and having groove structure therethrough.

12. In a system as recited in claim 5, said space including a second portion of said bore acting as a cylinder for the first piston large head, and a third portion of said bore acting as a cylinder for the second piston.

13. In a system as recited in claim 12, said second piston having a free-floating portion thereof and a part thereof in contact with said free-floating portion.

14. In a system as recited in claim 13, said free floating portion having a first end adjacent the first piston large head and a second end at said part of the second piston.

15. In a system as recited in claim 14, said free floating portion first end being concave.

16. In a system as recited in claim 15, said free floating portion being of malleable material.

17. In a system as recited in claim 15, said free-floating portion second end and said part of the second piston being in ball-and-socket contact.

18. In a system as recited in claim 15, said second piston having groove structure therearound.

19. In a system as recited in claim 12, said space having a bleeder vent therein.

20. In a system as recited in claim 5, said second piston including an end free of said housing, said motion output means including a piston sleeve head on the second piston free end.

21. In a system as recited in claim 20, said piston sleeve head including a piston sleeve returning over a portion of said housing, said portion of the housing acting as a guide for said piston sleeve.

22. In a system as recited in claim 21, said housing having a stop thereon at an end of said guide portion for limiting travel of said sleeve.

23. In a system as recited in claim 20, said motion-output means including a threaded portion for load connections.

24. In a system as recited in claim 5, said housing having a threaded connection at said first piston.

* * * * *